US008958665B2

(12) United States Patent
Evans et al.

(10) Patent No.: US 8,958,665 B2
(45) Date of Patent: Feb. 17, 2015

(54) SCATTERING DEVICE ON AN ARRAYED WAVEGUIDE GRATING

(71) Applicant: Infinera Corporation, Sunnyvale, CA (US)

(72) Inventors: Peter W. Evans, Mountain House, CA (US); Pavel Studenkov, Cupertino, CA (US); Mehrdad Ziari, Pleasanton, CA (US); Matthias Kuntz, Berkeley, CA (US); Scott Corzine, Sunnyvale, CA (US); Masaki Kato, Sunnyvale, CA (US); Vikrant Lal, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 32 days.

(21) Appl. No.: 13/675,594

(22) Filed: Nov. 13, 2012

(65) Prior Publication Data

US 2014/0133795 A1    May 15, 2014

(51) Int. Cl.
| | | |
|---|---|---|
| *G02B 6/27* | (2006.01) | |
| *G02B 6/34* | (2006.01) | |
| *G02B 6/293* | (2006.01) | |
| *G02B 6/12* | (2006.01) | |
| *H04J 14/02* | (2006.01) | |
| *G02F 1/00* | (2006.01) | |
| *G02B 6/122* | (2006.01) | |

(52) U.S. Cl.
CPC ........ *G02B 6/12016* (2013.01); *G02B 6/29301* (2013.01); *G02B 6/1228* (2013.01); *H04J 14/02* (2013.01); *G02B 6/2746* (2013.01); *G02F 1/00* (2013.01)
USPC ............................................... 385/11; 385/37

(58) Field of Classification Search
USPC .................. 385/11–14, 15, 16, 17, 33, 37
See application file for complete search history.

(56) References Cited

U.S. PATENT DOCUMENTS

| | | | | |
|---|---|---|---|---|
| 4,699,513 | A * | 10/1987 | Brooks et al. ................. | 356/478 |
| 6,650,796 | B2 * | 11/2003 | Davis .............................. | 385/10 |
| 2002/0149780 | A1 * | 10/2002 | Trinh ............................. | 356/477 |

* cited by examiner

*Primary Examiner* — Akm Enayet Ullah
(74) *Attorney, Agent, or Firm* — Harrity & Harrity LLP; David L. Soltz (57) ABSTRACT

An optical device may include a substrate; an arrayed waveguide grating provided on the substrate and having first and second slabs; multiple first waveguides extending from the first slab, the multiple first waveguides may supply respective first optical signals to the first slab; multiple second waveguides extending from the second slab, the multiple second waveguides may supply respective second optical signals to the second slab; a third waveguide extending from the second slab, the third waveguide outputting a third optical signal from the second slab, the third optical signal including the first optical signals; a fourth waveguide extending from the first slab, the fourth waveguide may output a fourth optical signal from the first slab, the fourth optical signal including the second optical signals; and a first scattering device optically coupled to a portion of an edge of the first slab between the multiple first waveguides and the fourth waveguide.

25 Claims, 8 Drawing Sheets

SCATTERING DEVICE ON AN ARRAYED WAVEGUIDE GRATING

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component to provide a laser associated with each wavelength, a modulator configured to modulate the output of the laser, and a multiplexer to combine each of the modulated outputs (e.g., to form a combined output or WDM signal).

The multiplexer may include a first slab, a second slab, and waveguides connected to the first slab and the second lab. The first slab may receive multiple inputs (e.g., the modulated outputs from the transmitter component), each having a different wavelength. The first slab may include a propagation region (e.g., a free space) to allow the received inputs to propagate into respective first ends of the waveguides connected to the first slab. Additionally, the waveguides may each have different lengths, such that each waveguide applies a different phase shift to the received inputs. Further, the waveguides may supply the received inputs (e.g., through respective second ends of the waveguides) to the second slab. The received inputs may propagate in the free space, associated with the second slab, in such a way that the second slab supplies a single combined output (e.g., a WDM signal) associated with the received inputs.

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, and various polymers and semiconductor materials which are used to make semiconductor lasers, such as GaAs, InP, and their alloys.

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

The demultiplexer may include a first slab, a second slab, and waveguides connected to the first slab and the second lab. The first slab may receive an input (e.g., a WDM signal outputted by a multiplexer). The received input may include optical signals, each having a different wavelength. The first slab may include a propagation region (e.g., a free space) to allow multiple optical signals, associated with the received input, to propagate into respective first ends of the waveguides connected to the first slab. Additionally, the waveguides may each have different lengths, such that each waveguide is configured to apply a different phase shift to the multiple optical signals associated with the received input. Further, the waveguides may supply the multiple optical signals (e.g., through respective second ends of the waveguides) to the second slab. The multiple optical signals may propagate through the free space, associated with the second slab, in such a way that the second slab supplies the multiple optical signals associated with the received input.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

SUMMARY

According to one example implementation, an optical device may include a substrate; an arrayed waveguide grating provided on the substrate, the arrayed waveguide grating having first and second slabs; multiple first waveguides extending from the first slab, the multiple first waveguides may supply respective first optical signals to the first slab; multiple second waveguides extending from the second slab, the multiple second waveguides may supply respective second optical signals to the second slab; a third waveguide extending from the second slab, the third waveguide may output a third optical signal from the second slab, the third optical signal including the first optical signals; a fourth waveguide extending from the first slab, the fourth waveguide outputting a fourth optical signal from the first slab, the fourth optical signal including the second optical signals; a first scattering device optically coupled to a portion of an edge of the first slab between the multiple first waveguides and the fourth waveguide; and a second scattering device optically coupled to a portion of an edge of the second slab between the multiple second waveguides and the third waveguide.

According to another example implementation, an optical device may include a substrate; an arrayed waveguide grating provided on the substrate, the arrayed waveguide grating having first and second slabs; a first waveguide extending from the first slab, the first waveguide may supply a first optical signal to the first slab; a second waveguide extending from the second slab, the second waveguide may supply a second optical signal to the second slab; multiple third waveguides extending from the second slab, the multiple third waveguides may output respective third optical signals from the second slab, the respective third optical signals being associated with the first optical signal; multiple fourth waveguides extending from the first slab, the multiple fourth waveguides may output respective fourth optical signals from the first slab, the respective fourth optical signals being associated with the second optical signal; a first scattering device optically coupled to a portion of an edge of the first slab between the first waveguide and the multiple fourth waveguides; and a second scattering device optically coupled to a portion of an edge of the second slab between the second waveguides and the multiple fourth third waveguides.

According to another example implementation, an optical device may include a substrate; an arrayed waveguide grating provided on the substrate, the arrayed waveguide grating having first and second slabs; a first waveguide extending from the first slab, the first waveguide may supply a first optical signal to the first slab; a second waveguide extending from the second slab, the second waveguide may output a second optical signals from the second slab, the second optical signal being associated with the first optical signal; one or more scattering devices optically coupled to a portion of an edge of the second slab.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Some implementations described herein may provide for a scattering device on an optical multiplexer or an optical demultiplexer to absorb and/or scatter an undesirable optical signal produced by the optical multiplexer or optical demultiplexer.

In some implementations, an optical multiplexer may include a first slab with first inputs to receive a first set of optical signals from an optical source, (e.g., one or more lasers, light emitting diodes (LEDs), super-luminescent LEDs, and/or some other optical source), and may include a second slab with a first output to provide a combined WDM signal associated with the first set of optical signals. Additionally, the optical multiplexer may include second inputs on the second slab to receive a second set of optical signals from an optical source, and may include a second output on the first slab to provide a combined WDM signal associated with the second set of optical signals.

In some implementations, the optical multiplexer may produce an undesirable signal (e.g. an optical signal associated with a high order mode and/or an optical signal which may not be associated with a fundamental mode) when producing a combined WDM signal. For example, the optical multiplexer may provide the undesirable signal to the second input on the second slab when providing the WDM signal to the second output (e.g., an optical signal intended for the second output may be provided to the second input). Additionally, or alternatively, the optical multiplexer may provide an undesirable signal to the first input on the first slab when providing the WDM signal to the first output (e.g., an optical signal intended for the first output may be provided to the first input). In some implementations, the undesirable optical signal may be provided to the optical source, thereby causing the optical source to receive a feedback signal.

In some implementations, an optical demultiplexer may include a first slab with a first input to receive a first optical signal (e.g., a combined WDM signal) from an optical source, (e.g., one or more lasers, light emitting diodes (LEDs), super-luminescent LEDs), optical multiplexers, and/or some other optical source), and may include a second slab with first outputs to provide a first set of optical signals associated with the first optical signal. Additionally, the optical demultiplexer may include a second input on the second slab to receive a second optical signal from an optical source, and may include second outputs on the first slab to provide a second set of optical signals associated with the second optical signal.

In some implementations, the optical demultiplexer may produce an undesirable signal when providing first or second sets of optical signals. For example, the optical demultiplexer may provide the undesirable signal to the second input on the second slab when providing the second set of optical signals to the second outputs (e.g., an optical signal intended for the second output may be provided to the second input). Additionally, or alternatively, the optical demultiplexer may provide an undesirable signal to the first input on the first slab when providing the first set of optical signals to the first output (e.g., an optical signal intended for the first output may be provided to the first input). In some implementations, the undesirable optical signal may be provided to the optical source, thereby causing the optical source to receive a feedback signal.

Some implementations may provide for a scattering device on the optical multiplexer or optical demultiplexer to receive, scatter, and/or absorb the undesirable signal such that the undesirable signal may not interfere with the optical source. For example, the scattering device may prevent the optical source from receiving the undesirable signal. Alternatively, the optical source may receive the undesirable signal only after the undesirable signal incurs substantial transmission loss such that the undesirable signal may not interfere with the optical source.

Figure 1:
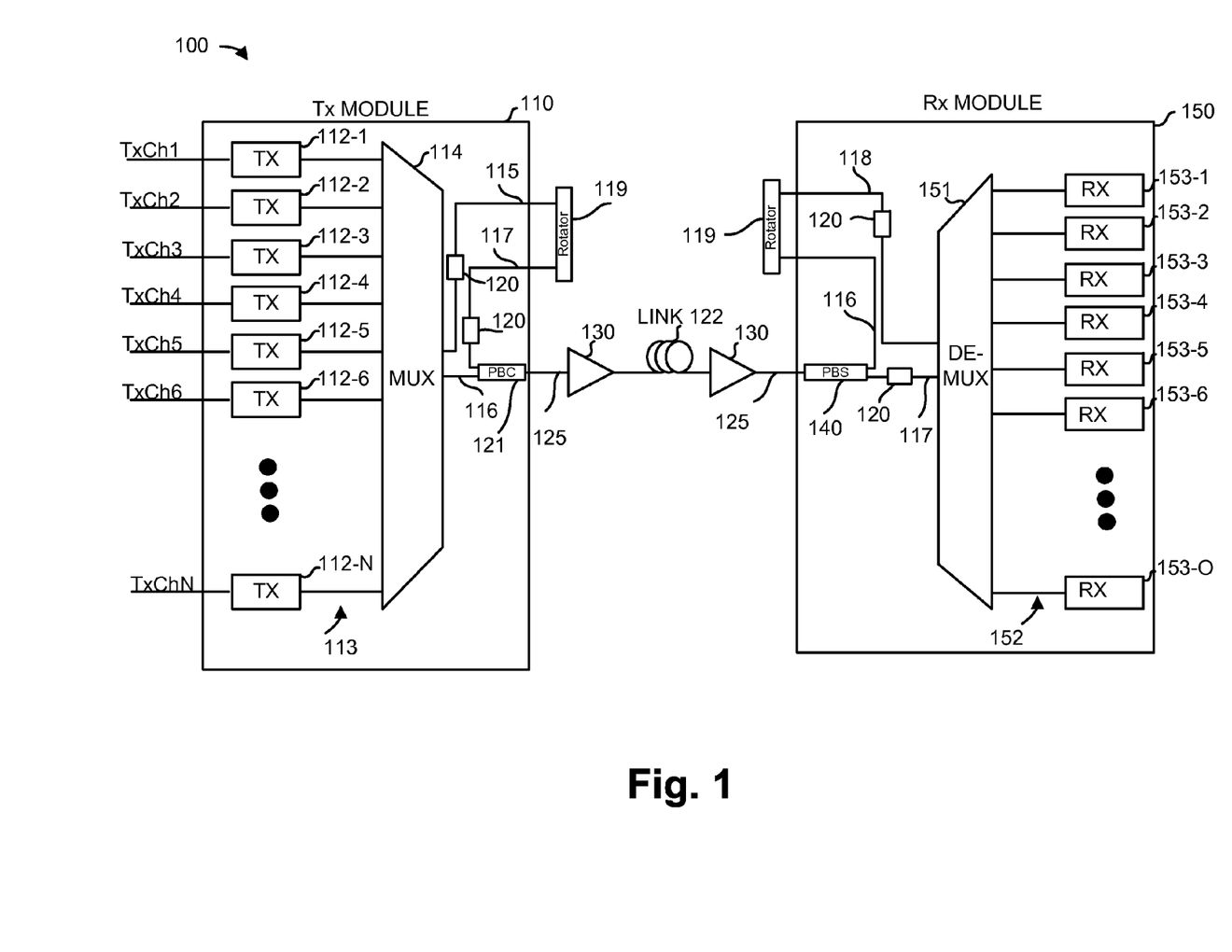
FIG. 1 is a diagram of an example network in which systems and/or methods may be implemented.

FIG. 1 is a diagram of an example network 100 in which systems and/or methods described herein may be implemented. In practice, network 100 may include additional, fewer, or differently arranged components than are shown in FIG. 1.

As illustrated in FIG. 1, network 100 may include transmitter (Tx) module 110 (e.g., a Tx PIC), rotators 119, and/or receiver (Rx) module 150 (e.g., an Rx PIC). In some implementations, transmitter module 110 may be optically connected to receiver module 150 via link 122, optical amplifiers 130, and/or PBS 140. Link 122 may include one or more optical amplifiers 130 that amplify an optical signal as the optical signal is transmitted over link 122.

Transmitter module 110 may include a number of optical transmitters 112-1 through 112-N (where N≥1), waveguides 113, optical multiplexer 114, polarizers 120, and/or polarization beam combiner (PBC) 121. Each optical transmitter 112 may receive a data channel (TxCh1 through TxChN), modulate the data channel with an optical signal, and transmit the data channel as an optical signal. In one implementation, transmitter module 110 may include 5, 10, 20, 50, 100, or some other number of optical transmitters 112. Each optical transmitter 112 may be tuned to use an optical carrier of a designated wavelength. It may be desirable that the grid of wavelengths emitted by optical transmitters 112 conform to a known standard, such as a standard published by the Telecommunication Standardization Sector (ITU-T).

In some implementations, each of optical transmitters 112 may include a laser, a modulator, a semiconductor optical amplifier (SOA), a light emitting diode (LED), and/or some other components. The laser, modulator, and/or SOA may be coupled with a tuning element (e.g., a heater) that can be used to tune the wavelength of the optical signal channel output by the laser, modulator, or SOA. In some implementations, a single laser may be shared by multiple optical transmitters 112.

Waveguides 113 may include an optical link or some other link to transmit modulated outputs (referred to as "signal channels") of optical transmitters 112. In some implementations, each optical transmitter 112 may connect to one waveguide 113 or to multiple waveguides 113 to transmit signal channels of optical transmitters 112 to optical multiplexer 114. In some implementations, waveguides 113 may be made from a birefringent material and/or some other material.

Optical multiplexer 114 may include an arrayed waveguide grating (AWG) or some other multiplexing device. In some implementations, optical multiplexer 114 may combine multiple signal channels, associated with optical transmitters 112, into wave division multiplexed (WDM) signals, such as optical signals 115 and 116. In some implementations, optical multiplexer 114 may include an input (e.g., a first slab to receive signal channels) and an output (e.g., a second slab to supply WDM signals, such as optical signals 115 and 116, associated with input signal channels). Optical multiplexer 114 may also include waveguides connecting the input and the output. In some implementations, the first slab and the second slab may each act as an input and an output. For example, the first slab and the second slab may each receive multiple signal channels. The first slab may supply a single WDM signal corresponding to the signal channels received by the second slab. The second slab may supply a single optical signal (e.g., a WDM signal) corresponding to the signal channels received by the first slab. As shown in FIG. 1, optical multiplexer 114 may receive signal channels outputted by optical transmitters 112, and output optical signals 115 and 116. Optical signals 115 and 116 may each include one or more optical signals, such that each optical signal includes one or more wavelengths.

Rotator 119 may include an optical device or a collection of optical devices. In some implementations, rotator 119 may receive an optical signal with components having a first polarization (e.g., a transverse magnetic (TM) polarization), rotate the polarization of the components, associated with the optical signal, and supply an optical signal with rotated components having a second polarization (e.g., a transverse electric (TE) polarization).

In some implementations, rotator 119 may be associated with transmitter module 110. Rotator 119 may receive components associated with optical signal 115 having a first polarization (e.g., a TM polarization), and supply optical signal 117 with rotated components having a second polarization (e.g., a TE polarization). As shown in FIG. 1, rotator 119 may supply optical signal 117 to PBC 121.

As described above, rotator 119 may be capable of receiving multiple sets of components associated with multiple optical signals and supplying multiple sets of rotated components associated with the received components. As shown in FIG. 1, rotator 119 may be located separate and/or detached from receiver module 150. Similarly, rotator 119 may be located separate and/or detached from transmitter module 110.

Polarizer 120 may include an optical device, or a collection of optical devices. In some implementations, polarizer 120 may receive an optical signal, and may absorb components of the optical signal having a particular polarization, such as a first polarization (e.g., a TM polarization) or a second polarization (e.g., a TE polarization). In some implementations, polarizers 120 may be associated with transmit module 110 and may receive optical signal 115 supplied by optical multiplexer 114 and/or optical signal 117 supplied by rotator 119.

In some implementations, polarizers 120 may absorb residual components of optical signal 117 having the first polarization. For example, as described above rotator 119 may rotate components associated with optical signal 115 having the first polarization, to supply optical signal 117 with components having the second polarization. Optical signal 117 may include residual components associated with the first polarization. Polarizer 120 may be connected along a path associated with optical signal 117 to absorb the residual components associated with the first polarization, thereby absorbing components having an undesirable polarization. Similarly, polarizer 120 may be connected along a path associated with optical signal 115 to absorb components having an undesirable polarization.

PBC 121 may include an optical device, or a collection of optical devices. In some implementations, PBC 121 may receive multiple optical signals and supply a combined optical signal (e.g., a WDM signal, or some other type of optical signal). For example, as shown in FIG. 1, PBC 121 may receive optical signal 116 and optical signal 117. PBC 121 may supply optical signal 125 based on receiving optical signals 116 and 117. In some implementations, optical signal 125 may include a combined WDM signal associated with optical signal 116 and/or optical signal 117.

As further shown in FIG. 1, receiver module 150 may include polarizers 120, PBS 140, optical demultiplexer 151, waveguides 152, and/or optical receivers 153-1 through 153-O (where O≥1). In some implementations, rotator 119 may be associated with receiver module 150 and may receive components associated with optical signal 116 having a first polarization (e.g., a TM polarization), and supply optical signal 118 with rotated components having a second polarization (e.g., a TE polarization). As shown in FIG. 1, rotator 119 may supply optical signal 118 to optical demultiplexer 151.

Receiver module 150 may include polarizers 120 to receive optical signal 117 supplied by PBS 140 and/or optical signal 118 supplied by rotator 119. In a similar manner as described above, polarizers 120 may absorb components of optical signal 118 having the first polarization (e.g., residual components of optical signal 118 having the first polarization when rotator 119 supplies optical signal 118). Similarly, polarizer 120 may be connected along a path associated with optical signal 117 to absorb components having an undesirable polarization.

PBS 140 may include an optical device or a collection of optical devices. In some implementations, PBS 140 may receive an input optical signal (e.g., optical signal 125 or some other signal), and supply output components associated with the input optical signal (e.g., via a first output and/or a second output of PBS 140). As shown in FIG. 1, PBS 140 may receive optical signal 125 supplied by PBC 121 (e.g., via link 122). PBS 140 may supply components, associated with optical signal 125, (e.g., via a first output and a second output), such as components associated with optical signal 116 (referred to as "first components 116"), and/or components associated with optical signal 117 (referred to as "second components 117"). In some implementations, PBS 140 may supply first components 116 to rotator 119, and supply second components 117 to optical demultiplexer 151. First components 116 may be associated with a first polarization (e.g., a TM polarization) while second components 117 may be associated with a second polarization (e.g., a TE polarization).

In some implementations, optical demultiplexer 151 may include an AWG or some other device. Optical demultiplexer 151 may supply multiple signal channels based on receiving a WDM signal (e.g., optical signal 125), or components associated with the WDM signal. For example, optical demultiplexer 151 may include an input (e.g., a first slab region to receive second components 117, optical signal 118 (referred to as "rotated components 118"), and/or some other input component), and an output (e.g., a second slab region to supply multiple signal channels associated with the input). Optical demultiplexer 151 may include waveguides connecting the input and the output. In some implementations, the first slab and the second slab may each act as an input and an output. For example, the first slab and the second slab may each receive components associated with a WDM signal. The first slab may supply signal channels corresponding to the components received by the second slab. The second slab my supply signal channels corresponding to the components received by the first slab. As shown in FIG. 1, optical demultiplexer 151 may supply signal channels to optical receivers 153 via waveguides 152.

Waveguides 152 may include optical links or some other links to transmit outputs of optical demultiplexer 151 to optical receivers 153. In some implementations, each optical receiver 153 may receive outputs via a single waveguide 152 or via multiple waveguides 152. In some implementation waveguides 152 may be made from a birefringent material and/or some other material.

Optical receivers 153 may each operate to convert the input optical signal to an electrical signal that represents the transmitted data. In some implementations, optical receivers 153 may each include one or more photodetectors and/or related devices to receive respective input optical signals outputted by optical demultiplexer 151 and a local oscillator, convert the signals to a photocurrent, and provide a voltage output to function as an electrical signal representation of the original input signal.

While FIG. 1 shows a particular configuration of components in network 100, in practice, network 100 may include additional components, different components, or differently arranged components than what are shown in FIG. 1.

Figure 2A:
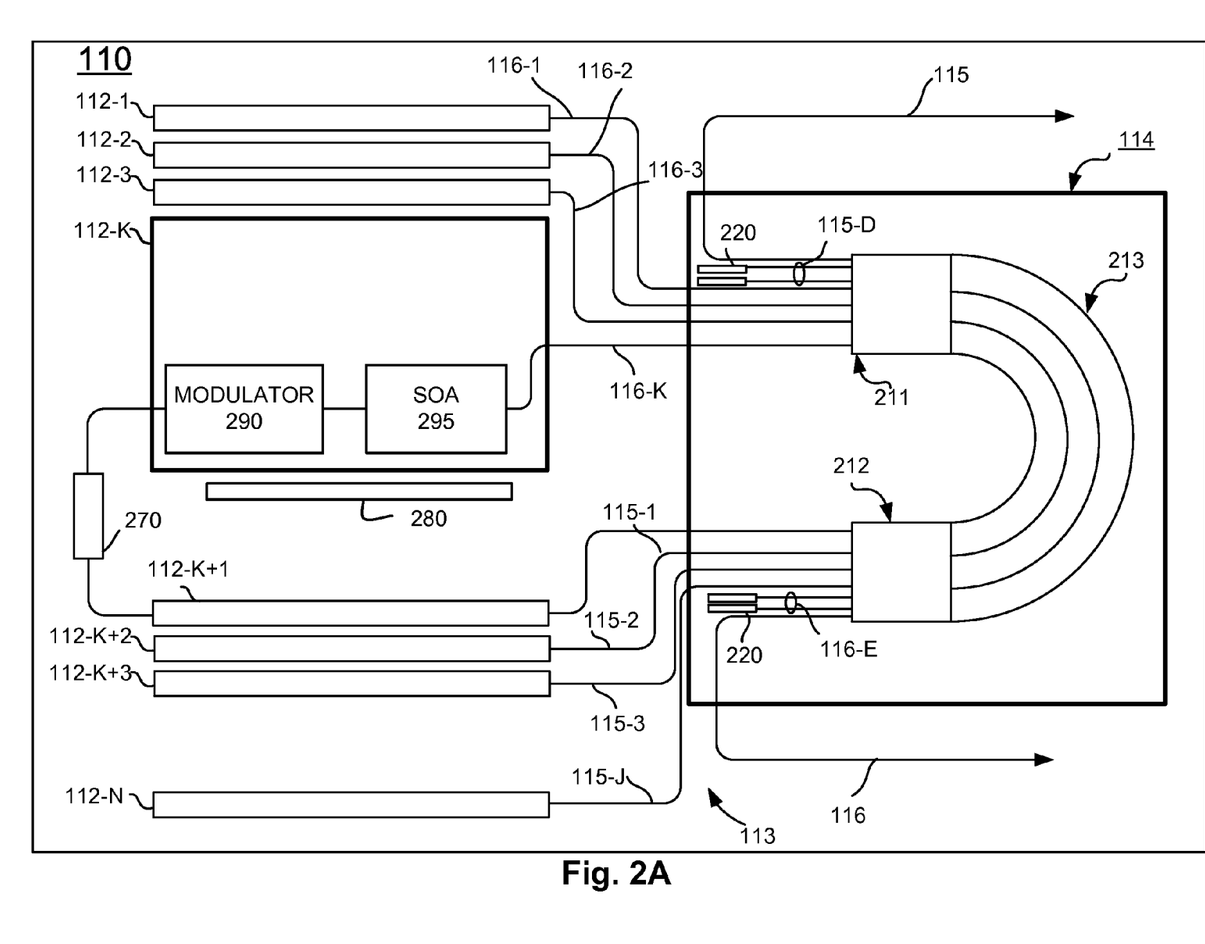
FIG. 2A is a diagram illustrating example components of a transmitter module as shown in FIG. 1.

FIG. 2A is a diagram illustrating example elements of transmitter module 110 shown in network 100 of FIG. 1. As shown in FIG. 2A, transmitter module 110 may include optical transmitters 112, waveguides 113, heater 280, and optical multiplexer 114. As described above, optical transmitters 112 may include laser 270, heater 280, modulator 290, and/or SOA 295.

Laser 270 may include a semiconductor laser, such as a distributed feedback (DFB) laser, or some other type of laser. Laser 270 may provide an output optical light beam to modulator 290. In some implementations, laser 270 may be an optical source for a single corresponding optical transmitter 112. In some implementations, laser 270 may be an optical source that is shared by multiple optical transmitters 112.

Heater 280 may include a heating device, or a collection of heating devices. In some implementations, heater 280 may be located adjacent to optical transmitter 112 such that heater 280 may tune a wavelength of an optical signal channel associated with laser 270, modulator 290, or SOA 295.

Modulator 290 may include an optical modulator such as an electro-absorption modulator (EAM), or some other type of modulator. Modulator 290 may control (modulate) the intensity of an input optical light beam (e.g., supplied by laser 270), based on an input voltage signal (e.g., signals provided over TxCh1 through TxChN). Modulator 290 may be formed as a waveguide with electrodes for applying an electric field, based on the input voltage signal, in a direction perpendicular to the light beam. Alternatively, modulator 290 may be implemented based on other modulation technologies, such as electro-optic modulation.

SOA 295 may include an amplifying device, or a collection of amplifying devices. In some implementations, SOA 295 may include an amplifier that may directly amplify an input optical signal (e.g., a signal supplied by laser 270). In some implementations, SOA 295 may be replaced by a variable optical attenuator (VOA), or by an element that combines both an SOA and a VOA.

Waveguides 113 may include individual waveguides associated with individual signal channels outputted by optical transmitters 112. For example, waveguides 113 may include corresponding waveguides to transmit signal channels 116-1, 116-2, 116-3 . . . 116-K (where K≥1) supplied by optical transmitters 112-1, 112-2, 112-3 . . . 112-K, respectively. Further, waveguides 113 may include corresponding waveguides to transmit signal channels 115-1, 115-2, 115-3 . . . 115-J (where J≥1) supplied by optical transmitters 112-K+1, 112-K+2, 112-K+3 . . . 112-N).

In some implementations, optical multiplexer 114 may include slabs 211 and 212, waveguides 213 and/or one or more scattering devices 220. Additionally, optical multiplexer 114 may include waveguides associated with optical signals received by optical multiplexer 114 or supplied by optical multiplexer 114 (e.g., waveguides 113).

Slabs 211 and 212 may each include a free-space region (e.g., a propagation region). The free-space regions of slabs 211 and 212 may allow the wavelengths, associated with input optical signals (e.g., signal channels received by optical transmitters 112-1 through 112-N), to propagate freely. Slab 211 may receive signal channels 112-1 through 112-K (where K≥1), thereby allowing the received signal channels to propagate in the free-space region of slab 211. Waveguides 213 may supply slab 211 with a combined WDM signal (e.g., optical signal 115) associated with the inputs of slab 212 (e.g. via a waveguide associated with optical signal 115). Further, waveguides 213 may supply slab 212 with a combined WDM signal (e.g., optical signal 116) associated with the inputs of slab 211 (e.g. via a waveguide associated with optical signal 116). In some implementations, optical signal 115 and/or optical signal 116 may be associated with optical signals having a fundamental order.

As a result of optical signals being transmitted via waveguides 213, undesirable optical signals may be generated (e.g. optical signals associated with high order modes and/or optical signals which may not be associated with fundamental modes). In some implementations, waveguides 213 may supply slab 211 with undesirable optical signals such as optical signals 115-D (where D≥1). Further, waveguides 213 may supply slab 212 with undesirable optical signals, such as optical signals 116-E (where E≥1). In some implementations, waveguides (e.g., "dump waveguides") may be provided on slab 211 (e.g., at "dump ports") to supply optical signals 115-D to respective scattering devices 220. Further, waveguides may be provided on slab 212 to supply optical signals 116-E to respective scattering devices 220.

As shown in FIG. 2A, the waveguides associated with optical signals 115-D may be provided on a portion of an edge of slab 211 in between waveguides associated with input optical signals (e.g., optical signals 116-1 through 116-K) and a waveguide associated with an output optical signal (e.g., optical signal 115). As a result, scattering devices 220 may receive optical signals 115-D thereby preventing optical transmitters 112 from receiving optical signals 115-D.

As further shown in FIG. 2A, the waveguides associated with optical signals 116-E may be provided on a portion of an edge of slab 212 in between waveguides associated with input optical signals (e.g., optical signals 115-1 through 115-J) and a waveguide associated with an output optical signal (e.g., optical signal 116). As a result, scattering devices 220 may receive optical signals 116-E thereby preventing optical transmitters 112 from receiving optical signals 116-E.

In some implementations, optical multiplexer 114 may be associated with a free spectral range (FSR) value such that the waveguides associated with optical signals 115-D and optical signals 116-E may transmit optical signals 115-D and optical signals 116-E to respective scattering devices 220.

In some implementations, scattering device 220 may include an optical device, or a collection of optical devices. For example, scattering device 220 may include a tapered waveguide scattering device, a beard-type scattering structure, a horns-type scattering structure, an absorption-type scattering structure (e.g., a material to absorb an optical signal), or some other type of scattering structure. In some implementations, scattering device 220 may receive an optical signal, such as one of optical signals 115-D and/or one of optical signals 116-E. In some implementations, scattering device 220 may receive multiple optical signals 115-D and/or multiple optical signals 116-E.

In some implementations, scattering device 220 may scatter, absorb, and/or dissipate a received optical signal, such as an undesired optical signal produced by multiplexer 114 (e.g., optical signal 115-D).

In some implementations, the transmission of optical signal 115-D through transmitter module 110 may be substantially reduced to the degree that optical signal 115-D may not be optically significant with respect to optical signals 115-1 through 115-J and optical signals 116-1 through 116-K. For example, the transmission of optical signal 115-D may be reduced by scattering device 220 by 20 decibels (dB), 30 dB, 40 dB, or by some other amount of dBs. As a result, undesired optical signals, produced by multiplexer 114, may be scattered, absorbed, and/or dissipated such that the undesired optical signals may not interfere (e.g., provide feedback) with components of transmitter module 110 (e.g., transmitters 112).

While the above is described in terms of scattering device 220 receiving optical signal 115-D, it will be apparent that scattering device 220 may receive and/or scatter optical signal 116-E in a manner similar to when scattering device 220 receives and/or scatters optical signal 115-D.

While particular components of transmitter module 110 are shown in FIG. 2A, in practice, the example implementations of transmitter module 110, shown in FIG. 2A, may include additional elements, fewer elements, or differently arranged elements than are shown in FIG. 2A.

Figure 2B:
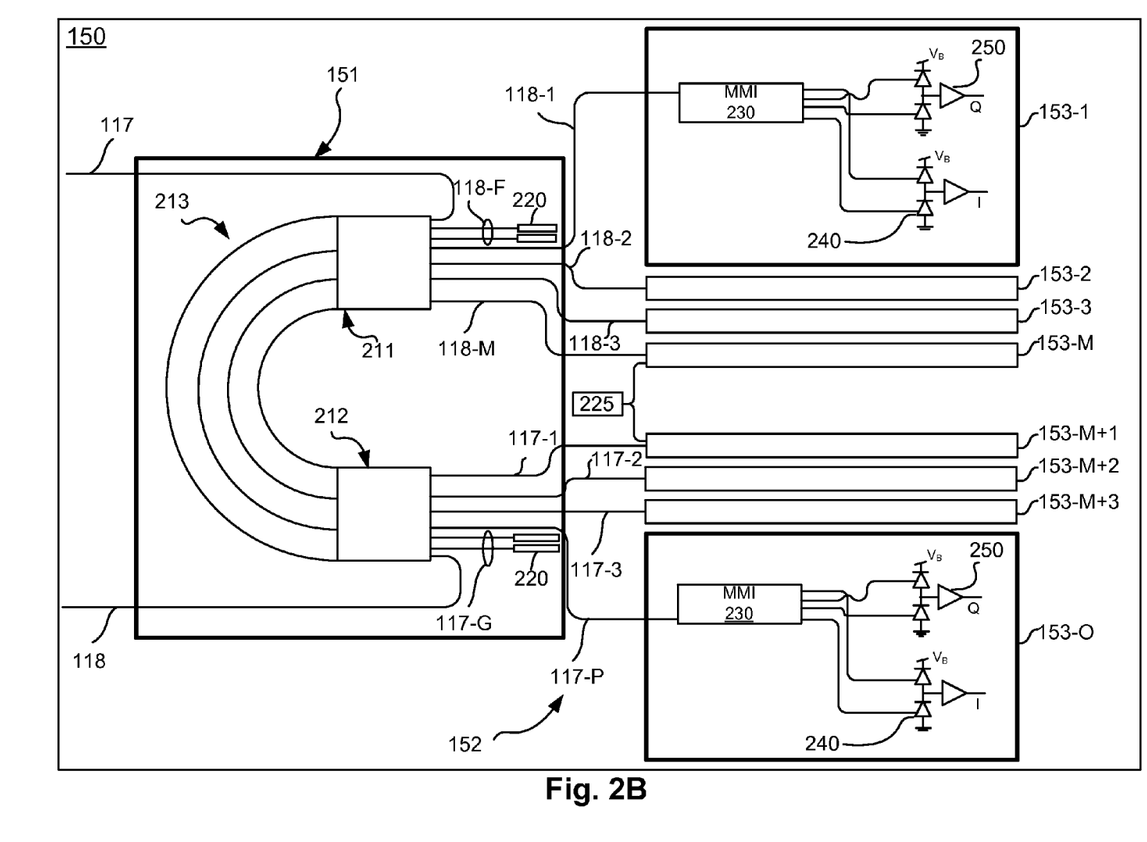
FIG. 2B is a diagram illustrating example components of a receiver module as shown in FIG. 1.

FIG. 2B is a diagram illustrating receiver module 150 shown in network 100 of FIG. 1. As shown in FIG. 2B, receiver module 150 may include optical demultiplexer 151, waveguides 152, local oscillator 225, and/or optical receivers 153. Optical demultiplexer 151 may include slab 211, slab 212, one or more waveguides 213 connected to slabs 211 and 212, and/or one or more scattering devices 220. Additionally, optical demultiplexer 151 may include waveguides associated with optical signals received by optical multiplexer 151 or supplied by optical multiplexer 151 (e.g., waveguides 152).

In some implementations, slabs 211 and 212 may include an input and an output. For example, slab 211 may receive an input (e.g., second components 117) and slab 212 may receive an input (e.g., rotated components 118). Waveguides 213 may supply slab 211 with output signal channels associated with the input of slab 212. Further, waveguides 213 may supply slab 212 with output signal channels associated with the input of slab 211.

Slabs 211 and 212 may each include a free-space region (e.g., a propagation region). The free-space regions of slabs 211 and 212 may allow the wavelengths, associated with input optical signals, to propagate freely. Slab 211 may receive second components 117, thereby allowing second components 117 to propagate in the free-space region of slab 211. Waveguides 213 may guide individual signal channels associated with second components 117 and supply the individual signal channels (e.g., optical signals 117-1 through 117-P, where P≥1) that may be outputted by slab 212. Slab 212 may also receive rotated components 118, thereby allowing rotated components 118 to propagate in the free-space region of slab 212. Waveguides 213 may guide individual signal channels associated with rotated components 118 (e.g., optical signals 118-1 through 118-M, where M≥1) and supply the individual signal channels that may be outputted by slab 211.

As shown in FIG. 2B, slabs 211 and 212 may supply respective signal channels to optical receivers 153 via waveguides 152. Waveguides 152 may include individual waveguides associated with individual signal channels outputted by slabs 211 and 212. For example, each of optical signals 117-1, 117-2, 117-3, and 117-P may include waveguides to supply optical signals 117-1, 117-2, 117-3, and 117-P to optical receivers 153-M+1, 153-M+2, 153-M+3, 153-O, (where O≥1), respectively. Additionally, waveguides 152 may include individual waveguides associated with individual signal channels associated with rotated components 118. For example, each of optical signals 118-1, 118-2, 118-3, and 118-M may include waveguides to supply optical signals to optical receivers 153-1, 153-2, 153-3, and 153-M, respectively. In some implementations, optical signals 117-1 through 117-P and/or optical signals 118-1 through 118-M may be associated with optical signals having a fundamental order.

As a result of optical signals being transmitted via waveguides 213, undesirable optical signals may be generated (e.g. optical signals associated with high order modes and/or optical signals which may not be associated with fundamental modes). In some implementations, waveguides 213 may supply slab 211 with undesirable optical signals, such as optical signals 118-F (where F≥1). Further, waveguides 213 may supply slab 212 with undesirable optical signals, such as optical signals 117-G (where G≥1). In some implementations, waveguides (e.g., "dump waveguides") may be provided on slab 211 to supply optical signals 118-F to respective scattering devices 220. Further, waveguides may be provided on slab 212 to supply optical signals 117-G to respective scattering devices 220.

As shown in FIG. 2B, the waveguides associated with optical signals 118-F may be provided on a portion of an edge of slab 211 in between waveguides associated with an input optical signal (e.g., second components 117) and a waveguide associated with an output optical signal (e.g., optical signal 118-1). As a result, scattering devices 220 may receive optical signals 118-F thereby preventing optical components from receiving optical signals 118-F.

As further shown in FIG. 2B, the waveguides associated with optical signals 117-G may be provided on a portion of an edge of slab 212 in between waveguides associated with an input optical signal (e.g., rotated first components 118) and a waveguide associated with an output optical signal (e.g., optical signal 117-P). As a result, scattering devices 220 may receive optical signals 117-G thereby preventing optical components from receiving optical signals 117-G.

In some implementations, optical demultiplexer 151 may be associated with an FSR value such that the waveguides, associated with optical signals 117-G and optical signals 118-F, may transmit optical signals 117-G and optical signals 118-F to respective scattering devices 220.

In some implementations, scattering device 220 may include an optical device, or a collection of optical devices. Some examples of scattering devices are described below with regards to FIGS. 4-6. In some implementations, scattering device 220 may include an absorption-type scattering structure (e.g., a material to absorb an optical signal), or some other type of scattering structure. In some implementations, scattering device 220 may receive an optical signal, such as one of optical signals 118-F and/or one of optical signals 117-G. In some implementations, scattering device 220 may receive multiple optical signals 118-F and/or multiple optical signals 117-G.

In some implementations, scattering device 220 may scatter, absorb, and/or dissipate a received optical signal, such as an undesired optical signal produced by optical demultiplexer 151 (e.g., optical signal 118-F). In some implementations, the transmission of optical signals 118-F through receiver module 150 may be substantially reduced to the degree that optical signal 118-F may not be optically significant with respect to optical signals 118-1 through 118-M and optical signals 117-1 through 117-P. For example, the transmission of optical signal 118-F may be reduced by scattering device 220 by 70 decibels (dB), 80 dB, 90 dB, or by some other amount of dBs. As a result, undesired optical signals, produced by optical demultiplexer 151, may be scattered, absorbed, and/or dissipated such that the undesired optical signals may not interfere (e.g., provide feedback) with components of receiver module 150 or transmitter module 110.

While the above is described in terms of scattering device 220 receiving optical signal 118-F, it will be apparent that scattering device 220 may receive and/or scatter optical signal 117-G in a manner similar to when scattering device 220 receives and/or scatters optical signal 118-F.

Local oscillator 225 may include a laser, a collection of lasers, or some other device. In some implementations, local oscillator 225 may include a laser to provide an optical signal to optical receivers 153. In some implementations, local oscillator 225 may include a single-sided laser to provide an optical signal to a coupler. In some other implementations, local oscillator 225 may include a double-sided laser to provide optical signals to respective optical receivers 153. Receiver module 150 may include multiple local oscillators 225, to provide optical signals to respective optical receivers 153.

Local oscillator 225 may provide a coherent detection system for optical receivers 153 (e.g., to allow optical receivers 153 to reconstruct a received optical signal having crosstalk or dispersion). For example, local oscillator 225 may provide optical receiver 153-M with a phase reference signal, such that optical receiver 153-M may reconstruct a received signal (e.g., signal channel 118-M supplied by optical demultiplexer 151) that may include linear crosstalk and/or dispersion.

As further shown in FIG. 2B, optical receivers 153 may each include multi-mode interference (MMI) coupler 230, photodiodes 240, and transimpedence amplifiers (TIAs) 250. Additionally, or alternatively, optical receivers 153 may include additional components, fewer components, or differently arranged components than are shown in FIG. 2B.

MMI coupler 230 may include an optical device to receive a signal channel supplied by optical demultiplexer 151 and/or an optical signal from local oscillator 225. In some implementations, MMI coupler 230 may supply multiple signals associated with the received signal channel and optical signal to photodiodes 240.

Photodiodes 240 may receive optical outputs from MMI coupler 230 and convert the optical outputs to corresponding electrical signals. In some implementations, photodiodes 240 may be arranged in pairs and connected to one another in a balanced configuration. The output of each balanced pair may supply one of a quadrature (Q) or in-phase (I) electrical signal, which is amplified by one of TIAs 250.

TIAs 250 may include an amplifying device, or collection of amplifying devices. In some implementations, TIAs 250 may receive electrical signals outputted by photodiodes 240, such as Q or I electrical signals or some other type of electrical signal. In some implementations, TIAs 250 may amplify an electrical signal, such as an electrical signal outputted by photodiodes 240. Additionally, or alternatively, TIAs 250 may amplify an electrical signal received from some other source.

While particular components are of receiver module 150 are shown in FIG. 2B, in practice, the example implementations of receiver module 150, shown in FIG. 2B, may include additional elements, fewer elements, or differently arranged elements than are shown in FIG. 2B.

Figure 3:
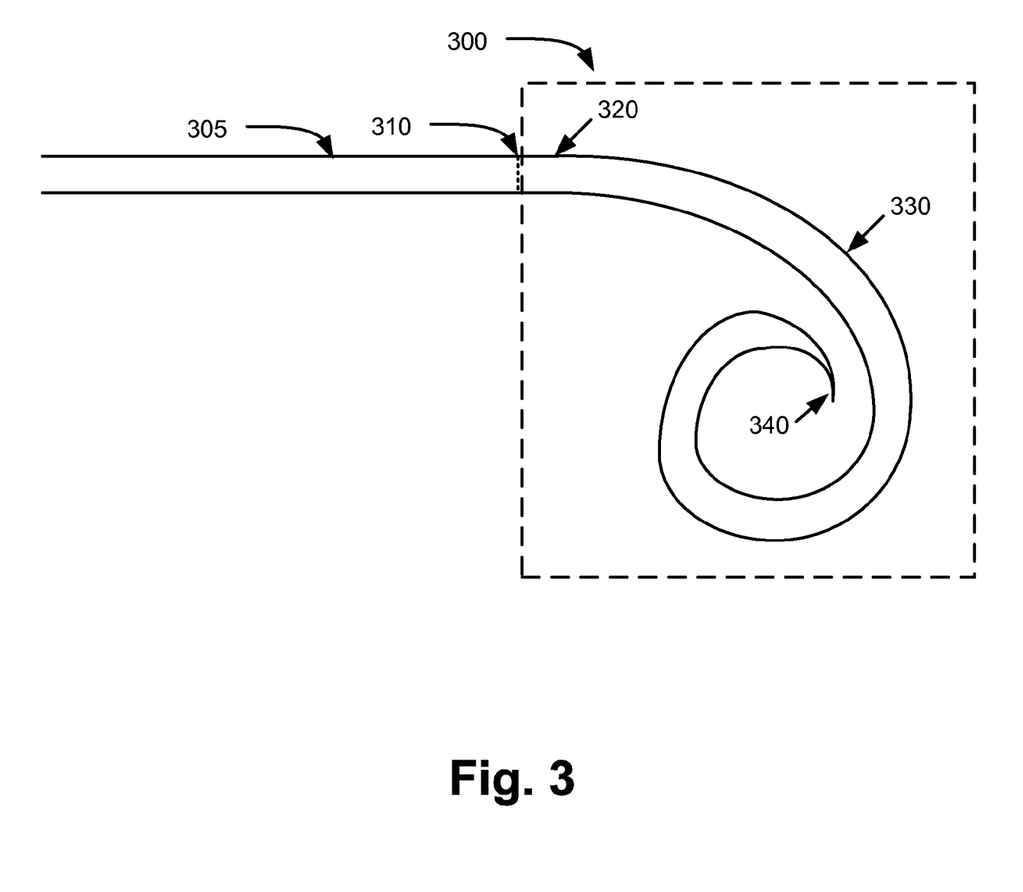
FIG. 3 is a diagram of an example implementation of a scattering device having a spiral waveguide structure.

FIG. 3 is a diagram of an example implementation of a scattering device 220 having a spiral waveguide structure 300. In some implementations, spiral waveguide structure 300 may include a spiral configuration at a terminal end of a waveguide to scatter undesired optical signals received by the waveguide. Spiral waveguide structure 300 can be used in series with other scattering devices 220. Spiral waveguide structure 300 can be made of the same material as waveguide 305, and may be progressively narrower (e.g., having a progressively narrower optical waveguide core width) and spiraled to cause guided optical signals in waveguide 305 to scatter a received optical signal while suppressing back-reflected optical signals.

In one implementation, spiral waveguide structure 300 may include a first portion 320 located near an output end 310 of waveguide 305 (e.g., a waveguide corresponding to an undesired optical signal, such as optical signal 115-D, 116-E, 117-G, 118-F, or some other optical signal), a second portion 330 that bends upon itself with a progressively smaller radius of curvature to allow an optical signal to radiate, and a third portion 340 that terminates to induce scattering of the optical signal. In some implementations, the progressively smaller radius of curvature may increase an effective index of an outside cladding of waveguide structure 300 such that a mode of the optical signal may not be confined. As a result, a refraction direction of the optical signal may prevent the optical signal from interfering with components of transmitter module 110 and/or receiver module 150.

While a particular configuration of spiral waveguide structure 300 is shown in FIG. 3, in practice, spiral waveguide structure 300 may have different dimensions and/or curvatures than what is shown in FIG. 3.

Figure 4:
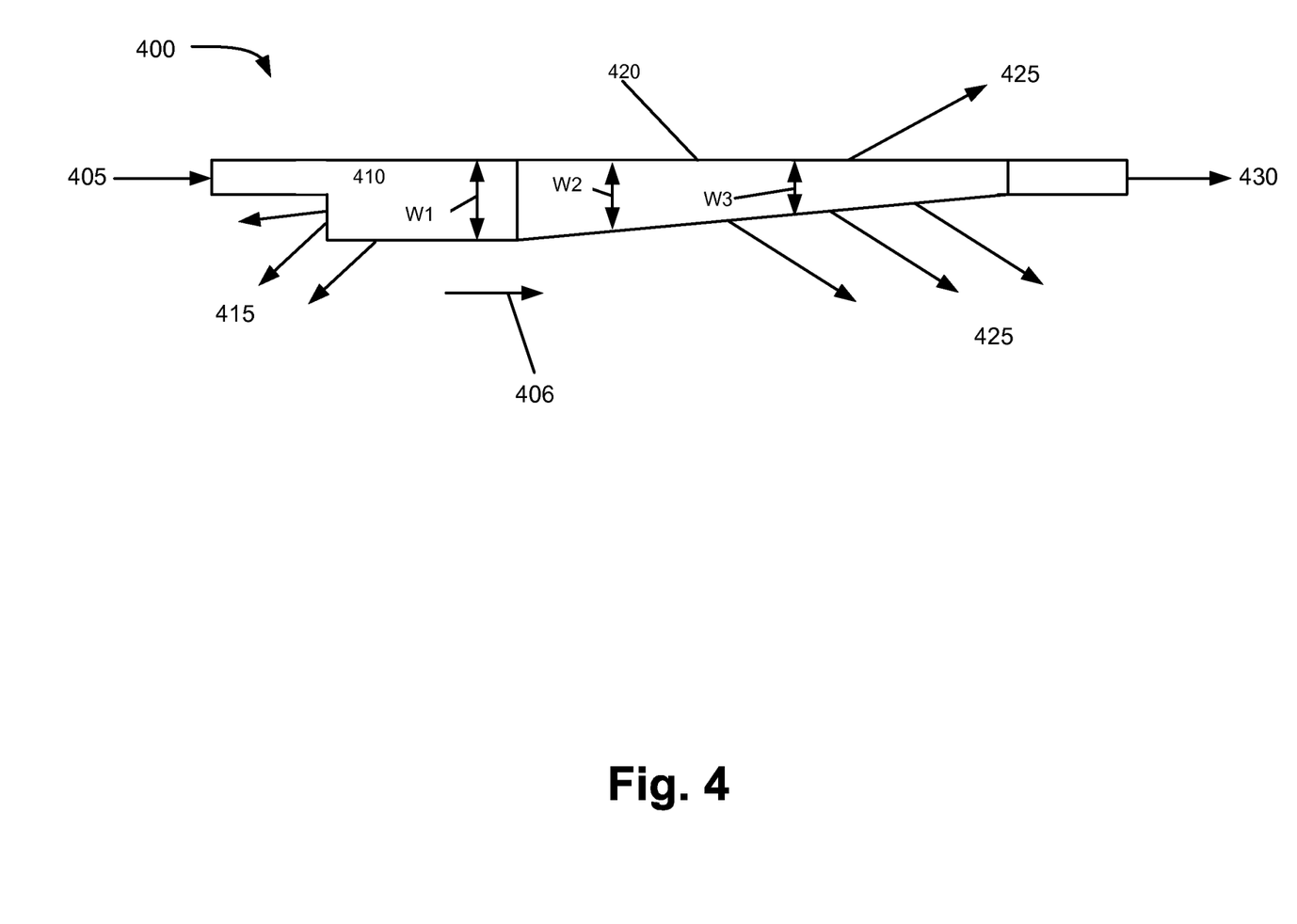
FIG. 4 is a diagram of another example of scattering device having a tapered multi-mode waveguide structure.

FIG. 4 is a diagram of another example of scattering device 220, such as tapered multi-mode waveguide structure 400. In some implementations, tapered multi-mode waveguide structure 400 may correspond to an MMI waveguide or some other type of waveguide. In some implementations, tapered multi-mode waveguide structure 400 may include a single-mode input waveguide 405 that receives an undesired or stray optical signal (e.g., optical signal 115-D, 116-E, 117-G, 118-F, or some other optical signal) propagating in a direction indicated by arrow 406. Tapered multi-mode waveguide structure 400 may further include a multi-mode waveguide section 410, tapered section 420, and output portion 430. Section 410 may have a constant width W1 that extends in a direction transverse to arrow 406. Section 420 may have a tapered width that narrows in the direction of arrow 406. Accordingly, as further shown in FIG. 4, section 420 has a width (W2) adjacent section 410 that may be greater than a width (W3) near output portion 430. Widths W2 and W3 may also extend in a direction transverse to arrow 406, or in some other direction. In some implementations, section 420 may be tapered to cause a mode of an input optical signal (e.g., optical signal 115-D, 116-E, 117-G, 118-F, or some other optical signal) to expand adiabatically in a direction relatively reverse to an input waveguide of optical multiplexer 114 or optical demultiplexer 152.

In some implementations, tapered multi-mode waveguide structure 400 can be made of the same material as waveguides 113, 152, or 213. In another implementation, tapered multi-mode waveguide structure 400 may be made of a different material from waveguides 113, 152, or 213, and can include more than one material, including transparent and/or absorptive materials.

Additionally, or alternatively, tapered multi-mode waveguide structure 400 may be capable of suppressing a reflected optical signal from returning to input waveguide 405 and may be further capable of transmitting the optical signal away from input waveguide 405, reducing the optical signal into multiple portions, such as portions 415 and 425, and scattering portions 415 and 425 away from a particular location (e.g., such that portions 415 and 425 may not interfere with components of transmitter module 110 and/or receiver module 150). Additionally, tapered multi-mode waveguide structure 400 may direct remaining portions of the optical signal to output portion 430 that can then be fed into an additional scattering device 220. For example, spiral waveguide structure 300 may be attached to tapered multi-mode waveguide structure 400, such that input 310 of spiral waveguide structure 300 may be attached to output portion 430 of tapered multi-mode waveguide structure 400.

While a particular configuration of tapered multi-mode waveguide structure 400 is shown in FIG. 4, in practice, tapered multi-mode waveguide structure 400 may include additional, fewer, or differently arranged sections, widths, and/or dimensions than what is shown in FIG. 4.

Figure 5:
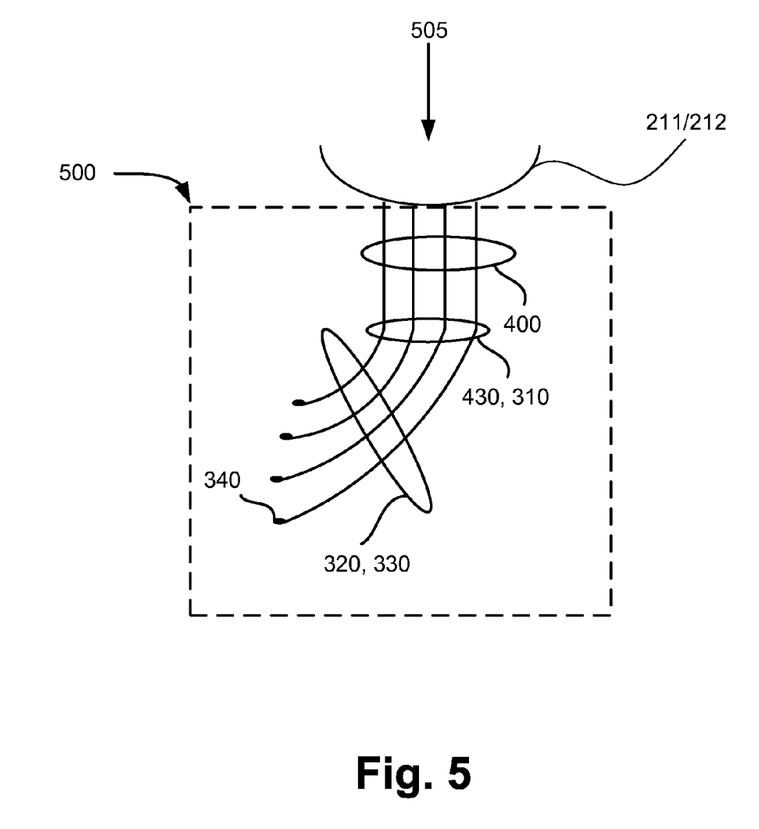
FIG. 5 is a diagram illustrating another example of scattering device having a combined scattering structure.

FIG. 5 is a diagram illustrating another example of scattering device 220, such as combined scattering structure 500. As shown in FIG. 5, combined scattering structure 500 may be attached to an end of slab 211 and/or slab 212. In some implementations, combined scattering structure 500 may include waveguides 400 (e.g., tapered MMI waveguides in accordance with the structure as described above with respect to FIG. 4), and components of spiral waveguide structure 300, such as input end 310, first portion 320, second portion 330, and third portion 340. In some implementations, output portion 430 of tapered multi-mode waveguide structure 400 may provide an optical signal to input end 310 of spiral waveguide structure 300 such that spiral waveguide structure 300 may scatter the optical signal received by input end 310 in a manner as described above with respect to FIG. 3. As a result, combined scattering structure 500 may receive an undesirable optical signal such that the undesirable optical signal may not interfere with components of transmitter module 110 and/or receiver module 150.

As further shown in FIG. 5, slab 211 and/or slab 212 may be convex such that optical signal 505 (e.g., an optical signal corresponding to optical signal 115-D, 116-E, 117-G, 118-M, or some other optical signal) may be received by combined scattering structure 500.

While a particular configuration of combined scattering structure 500 is shown in FIG. 5, in practice, combined scattering structure 500 may include additional, fewer, or differently arranged sections and/or proportions than shown in FIG. 5.

Figure 6:
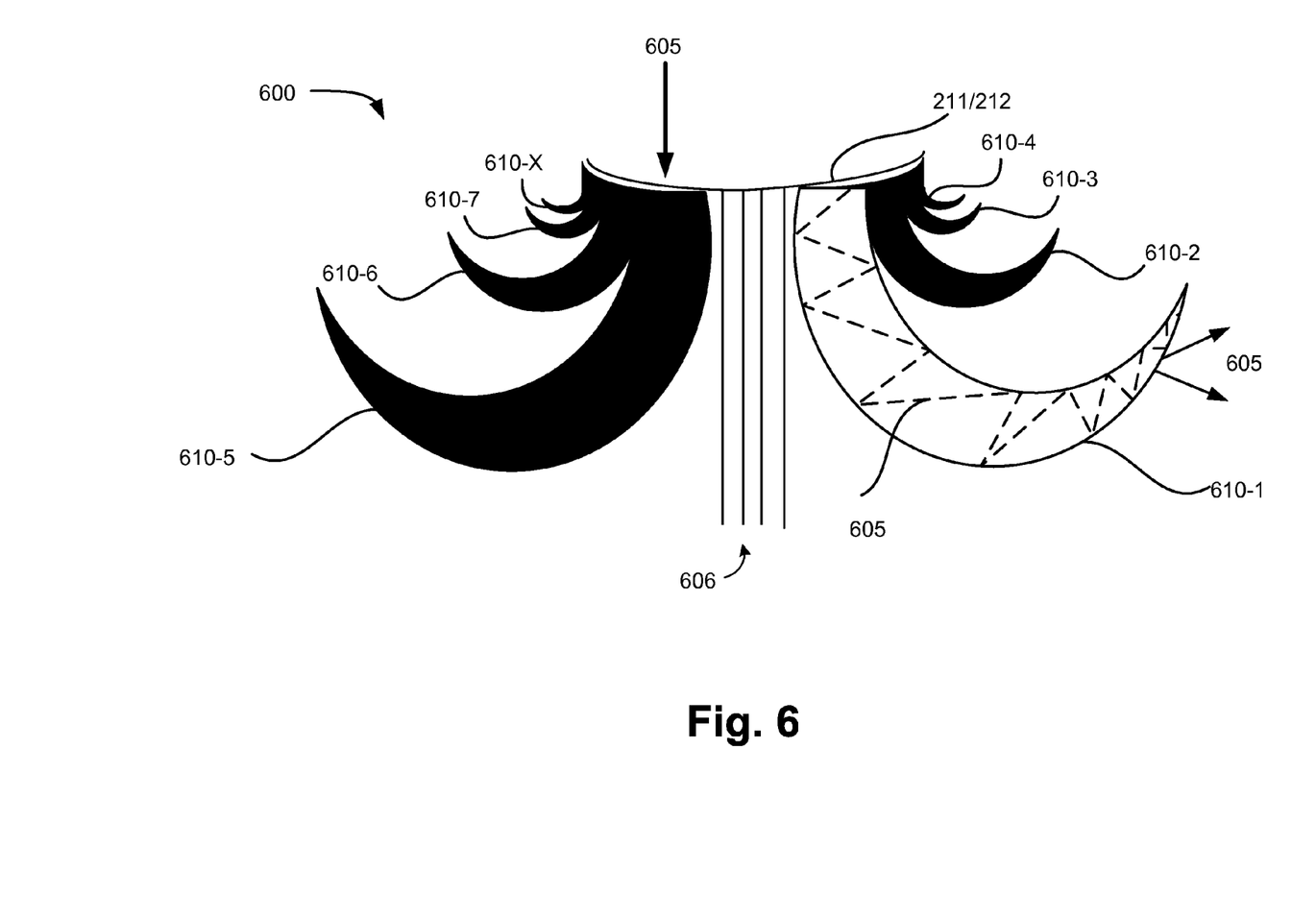
FIG. 6 is a diagram of another example scattering device having a horns-type scattering structure.

FIG. 6 is a diagram of another example scattering device 220, such as a horns-type scattering structure 600. As shown in FIG. 6, scattering structure 600 may include waveguides 606 and scattering sections 610-1 through 610-X. In some implementations, waveguides 606 may be provided in between a first set of scattering sections (e.g., sections 610-1 through 610-4, as shown in FIG. 6), and a second set of scattering sections (e.g., sections 610-5 through 610-X). In some implementations, waveguides 606 may correspond to one or more of waveguides 113 and/or one or more of waveguides 152.

In some implementations, optical signal 605 (e.g., an undesirable optical signal, such as optical signal 115-D, 116-E, 117-G, 118-F, or some other optical signal), may pass through slab 211/212 and may be received by one or more of scattering sections, such as scattering sections 610-1 through 610-X. In some implementations, each of scattering sections 610-1 through 610-X may include a waveguide material, such as a birefringent material and may cause a received optical signal (e.g., optical signal 605) to reflect against multiple edges of respective scattering sections 610-1 through 610-X. For clarity, a cross section of section 610-1 is shown to illustrate the reflection of the received optical signal (e.g., optical signal 605).

As a result of the reflection of the received optical signal within section 610-1, the received optical signal may incur a substantial transmission loss (e.g., a 10 dB loss, a 20 dB loss, a 30 dB loss, or some other loss) such that the received optical signal may not be received by components of an associated module (e.g. transmitter module 110 or receiver module 150) or cause feedback or interference within the associated module.

In some implementations, scattering structure 600 may be combined with spiral structure 300, tapered multi-mode waveguide structure 400, and/or combined scattering structure 500. For example, scattering structure 600 may be connected at an end of section 420 of tapered multi-mode waveguide structure 400 to receive a portion of an optical signal via output portion 430.

While a particular configuration of horns scattering structure 600 is shown in FIG. 6, in practice, horns scattering structure 600 may include additional, fewer, or differently arranged sections and/or proportions than what is shown in FIG. 6.

Figure 7:
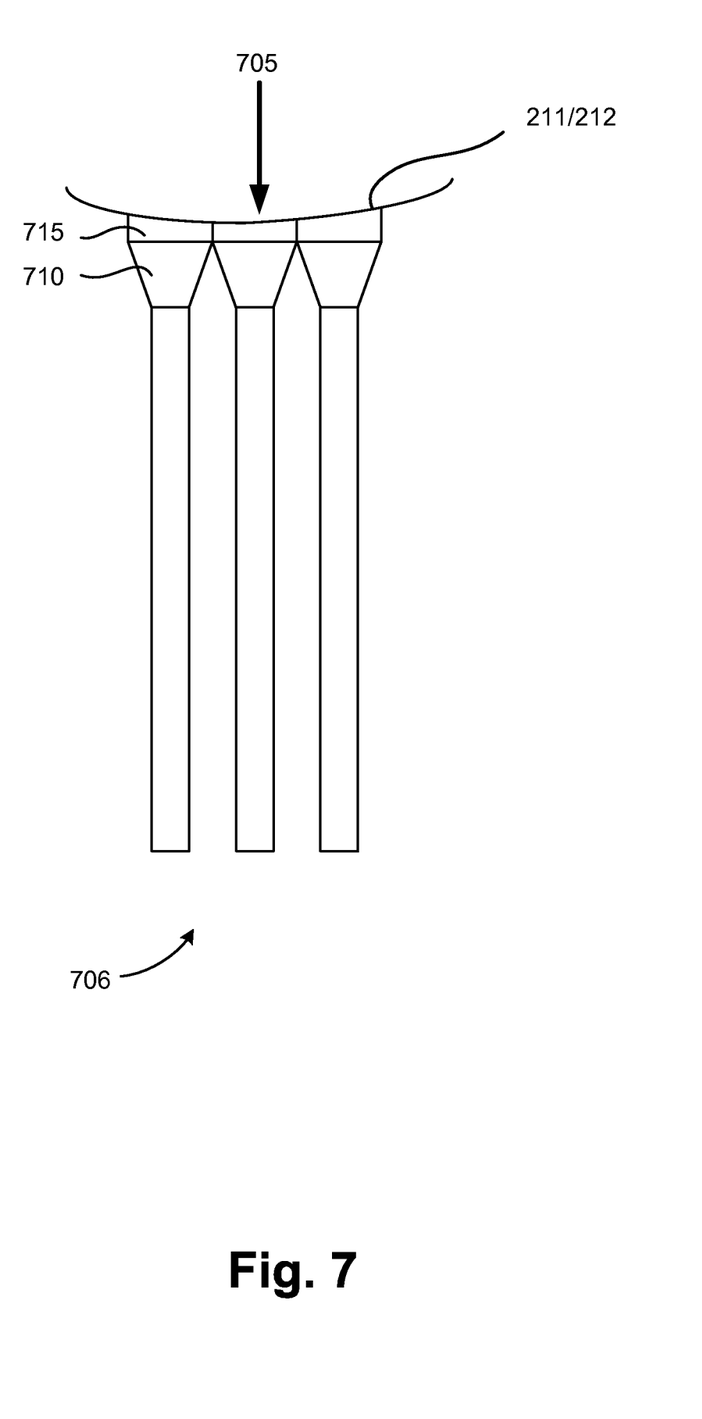
FIG. 7 is a diagram illustrating example waveguides.

FIG. 7 is a diagram illustrating example waveguides. In some implementations, waveguides 706 may correspond to waveguides associated with optical signals 115-D, 116-E, 117-G, 118-F. As shown in FIG. 7, each one of waveguides 706 may include gapped section 710 being substantially V-shaped. In some implementations, gapped section 710 may cause an undesirable signal (e.g., optical signal 705 received by slab 211 or slab 212) to scatter as a result of the shape of section 710. In some implementations, each of waveguides 706 may include gap section 715 which may further cause a transmission loss associated with an undesirable optical signal.

While a particular configuration of waveguides 706 is shown in FIG. 7, in practice, waveguides 706 may include additional, fewer, or differently arranged sections and/or proportions than what is shown in FIG. 7.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise. Also, any reference to components having a Transverse Electric (TE) polarization may also apply to components having a Transverse Magnetic (TM) polarization. Further, any reference to components having a TM polarization may also apply to components having a TE polarization.

What is claimed is:

1. An optical device, comprising:
   a substrate;
   an arrayed waveguide grating provided on the substrate, the arrayed waveguide grating having first and second slabs;
   a plurality of first waveguides extending from the first slab, the plurality of first waveguides supplying respective first optical signals to the first slab;
   a plurality of second waveguides extending from the second slab, the plurality of second waveguides supplying respective second optical signals to the second slab;
   a third waveguide extending from the second slab, the third waveguide outputting a third optical signal from the second slab, the third optical signal including the first optical signals;
   a fourth waveguide extending from the first slab, the fourth waveguide outputting a fourth optical signal from the first slab, the fourth optical signal including the second optical signals;
   one or more first scattering devices optically coupled to a portion of an edge of the first slab between the plurality of first waveguides and the fourth waveguide; and
   one or more second scattering devices optically coupled to a portion of an edge of the second slab between the plurality of second waveguides and the third waveguide.

2. The optical device in accordance with claim 1, where the one or more first scattering devices are configured to receive a fifth optical signal from the first slab and where the one or more second scattering devices are configured to receive a sixth optical signal from the second slab, where the third optical signal and the fourth optical signal are associated with fundamental order optical signals and the fifth optical signal and sixth optical signal are associated with higher order optical signals.

3. The optical device in accordance with claim 2, the one or more first scattering devices each having a first region to receive the fifth optical signal and a second region having a tapered end configured to scatter the fifth optical signal; and
   the one or more second scattering devices each having a first region to receive the sixth optical signal and a second region having a tapered end configured to scatter the sixth optical signal.

4. The optical device in accordance with claim 2, the one or more first scattering devices each having a first region to receive the fifth optical signal, a second region having a tapered end configured to scatter the fifth optical signal and output a portion of the fifth optical signal, and a third region having a spiraled section configured to receive the portion of the fifth optical signal and scatter the portion of the fifth optical signal; and
   the one or more second scattering devices each having a first region to receive the sixth optical signal, a second region having a tapered end configured to scatter the sixth optical signal and output a portion of the sixth optical signal, and a third region having a spiraled section configured to scatter the portion of the sixth optical signal.

5. The optical device in accordance with claim 2, the one or more first scattering devices each having:
   at least one first multimode waveguide section to receive the fifth optical signal, the at least one first multimode waveguide section being configured to cause the fifth optical signal to reflect within the at least one first multimode waveguide section to scatter the fifth optical signal; and
   the one or more second scattering devices each having:
   at least one second multimode waveguide section to receive the sixth optical signal, the at least one second multimode waveguide section being configured to cause the sixth optical signal to reflect within the at least one second multimode waveguide section to scatter the sixth optical signal.

6. The optical device in accordance with claim 2, the one or more first scattering devices each having:
   a first region to receive the fifth optical signal, a second region having a tapered end configured to scatter the fifth optical signal and output a portion of the fifth optical signal, and a third region having at least one first multimode waveguide section to receive the portion of the fifth optical signal, the at least one first multimode waveguide section being configured to cause the portion of the fifth optical signal to reflect within the at least one first multimode waveguide section to scatter the portion of the fifth optical signal; and
   the one or more second scattering devices each having:
   a first region to receive the sixth optical signal, a second region having a tapered end configured to scatter the sixth optical signal and output a portion of the sixth optical signal, and a third region having at least one second multimode waveguide section to receive the sixth optical signal, the at least one second multimode waveguide section being configured to cause the portion of the sixth optical signal to reflect within the at least one second multimode waveguide section to scatter the portion of the sixth optical signal.

7. The optical device in accordance with claim 1, where each of the respective first optical signals has a corresponding one of a plurality of wavelengths, and each of the respective second optical signals has a corresponding one of the plurality of wavelengths.

8. The optical device in accordance with claim 1, further comprising:
one or more lasers configured to provide the respective first optical signals and the respective second optical signals.

9. The optical device in accordance with claim 1, further comprising:
a light emitting diode or a super-luminescent light emitting diode configured to provide the respective first optical signals and the respective second optical signals.

10. The optical device in accordance with claim 1, where the third optical signal includes first components having a first polarization, and the fourth optical signal includes second components having a second polarization, the optical device further comprising:
a rotator comprising:
an input that receives the third optical signal associated with the first components,
the rotator being configured to rotate the first polarization such that each of the first components has the second polarization, the rotator outputting the first components as rotated first components; and
a polarization beam combiner configured to receive the rotated first components and the second components to generate a combined optical signal and configured to provide the combined optical signal to a receiver component.

11. The optical device in accordance with claim 10, where the first polarization is a transverse electric (TE) polarization and the second polarization is a transverse magnetic (TM) polarization.

12. The optical device in accordance with claim 10, where the first polarization is a transverse magnetic (TM) polarization and the second polarization is a transverse electric (TE) polarization.

13. An optical device, comprising:
a substrate;
an arrayed waveguide grating provided on the substrate, the arrayed waveguide grating having first and second slabs;
a first waveguide extending from the first slab, the first waveguide supplying a first optical signal to the first slab;
a second waveguide extending from the second slab, the second waveguide supplying a second optical signal to the second slab;
a plurality of third waveguides extending from the second slab, the plurality of third waveguides outputting respective third optical signals from the second slab, the respective third optical signals being associated with the first optical signal;
a plurality of fourth waveguides extending from the first slab, the plurality of fourth waveguides outputting respective fourth optical signals from the first slab, the respective fourth optical signals being associated with the second optical signal;
one or more first scattering devices optically coupled to a portion of an edge of the first slab between the first waveguide and the plurality of fourth waveguides; and
one or more second scattering devices optically coupled to a portion of an edge of the second slab between the second waveguide and the plurality of third waveguides.

14. The optical device in accordance with claim 13, where the one or more first scattering devices are configured to receive a fifth optical signal from the first slab and where the one or more second scattering devices are configured to receive a sixth optical signal from the second slab, where the respective third optical signals and the respective fourth optical signals are associated with fundamental order optical signals and the fifth optical signal and sixth optical signal are each associated with higher order optical signals.

15. The optical device in accordance with claim 14, the one or more first scattering devices each having a first region to receive the fifth optical signal and a second region having a tapered end configured to scatter the fifth optical signal; and
the one or more second scattering devices each having a first region to receive the sixth optical signal and a second region having a tapered end configured to scatter the sixth optical signal.

16. The optical device in accordance with claim 14, the one or more first scattering devices each having a first region to receive the fifth optical signal, a second region having a tapered end configured to scatter the fifth optical signal and output a portion of the fifth optical signal, and a third region having a spiraled section configured to receive the portion of the fifth optical signal and scatter the portion of the fifth optical signal; and
the one or more second scattering devices each having a first region to receive the sixth optical signal, a second region having a tapered end configured to scatter the sixth optical signal and output a portion of the sixth optical signal, and a third region having a spiraled section configured to scatter the portion of the sixth optical signal.

17. The optical device in accordance with claim 14, the one or more first scattering devices each having:
at least one first multimode waveguide section to receive the fifth optical signal, the at least one first multimode waveguide section being configured to cause the fifth optical signal to reflect within the at least one first multimode waveguide section to scatter the fifth optical signal; and
the one or more second scattering devices each having:
at least one second multimode waveguide section to receive the sixth optical signal, the at least one second multimode waveguide section being configured to cause the sixth optical signal to reflect within the at least one second multimode waveguide section to scatter the sixth optical signal.

18. The optical device in accordance with claim 14, the one or more first scattering devices each having:
a first region to receive the fifth optical signal, a second region having a tapered end configured to scatter the fifth optical signal and output a portion of the fifth optical signal, and a third region having at least one first multimode waveguide section to receive the portion of the fifth optical signal, the at least one first multimode waveguide section being configured to cause the portion of the fifth optical signal to reflect within the at least one first multimode waveguide section to scatter the portion of the fifth optical signal; and
the one or more second scattering devices each having:
a first region to receive the sixth optical signal, a second region having a tapered end configured to scatter the sixth optical signal and output a portion of the sixth optical signal, and a third region having at least one second multimode waveguide section to receive the sixth optical signal, the at least one second multimode waveguide section being configured to cause the portion of the sixth optical signal to reflect within the at least one second multimode waveguide section to scatter the portion of the sixth optical signal.

19. The optical device in accordance with claim 13, where each of the respective third optical signals has a corresponding one of a plurality of wavelengths, and each of the respective fourth optical signals has a corresponding one of the plurality of wavelengths.

20. An optical device, comprising:
a substrate;
an arrayed waveguide grating provided on the substrate, the arrayed waveguide grating having first and second slabs;
a first waveguide extending from the first slab, the first waveguide supplying a first optical signal to the first slab;
a second waveguide extending from the second slab, the second waveguide outputting a second optical signals from the second slab, the second optical signal being associated with the first optical signal; and
one or more scattering devices optically coupled to a portion of an edge of the second slab.

21. The optical device in accordance with claim 20, where the one or more scattering devices are configured to receive a third optical signal from the second slab where the second optical signal is associated with a fundamental order optical signal and the third optical signal is associated with a higher order optical signal.

22. The optical device in accordance with claim 21, the one or more scattering devices each having a first region to receive the third optical signal and a second region having a tapered end configured to scatter the third optical signal.

23. The optical device in accordance with claim 21, the one or more scattering devices each having a first region to receive the third optical signal, a second region having a tapered end configured to scatter the third optical signal and output a portion of the third optical signal, and a third region having a spiral section to receive the portion of the third optical signal and scatter the portion of the third optical signal.

24. The optical device in accordance with claim 21, the one or more scattering devices each having at least one multimode waveguide section to receive the third optical signal, the at least one multimode waveguide section being configured to cause the third optical signal to reflect within the at least one multimode waveguide section to scatter the third optical signal.

25. The optical device in accordance with claim 21, the one or more scattering devices each having a first region to receive the third optical signal, a second region having a tapered end configured to scatter the third optical signal and output a portion of the third optical signal, and a third region having at least one multimode waveguide section to receive the portion of the third optical signal, the at least one multimode waveguide section being configured to cause the portion of the third optical signal to reflect within the at least one multimode waveguide section to scatter the portion of the third optical signal.

* * * * *